United States Patent
Toepker

(10) Patent No.: US 8,205,898 B2
(45) Date of Patent: Jun. 26, 2012

(54) TWIST BEAM WITH INTERLOCK

(75) Inventor: Dieter Toepker, Waterford, MI (US)

(73) Assignee: Magna International Inc., Aurora, Ontario (CA)

( * ) Notice: Subject to any disclaimer, the term of this patent is extended or adjusted under 35 U.S.C. 154(b) by 147 days.

(21) Appl. No.: 12/676,691

(22) PCT Filed: Sep. 4, 2008

(86) PCT No.: PCT/CA2008/001558
§ 371 (c)(1),
(2), (4) Date: Mar. 5, 2010

(87) PCT Pub. No.: WO2009/030026
PCT Pub. Date: Mar. 12, 2009

(65) Prior Publication Data
US 2010/0301577 A1   Dec. 2, 2010

(51) Int. Cl.
*B60G 21/05* (2006.01)
(52) U.S. Cl. .................................. 280/124.106
(58) Field of Classification Search .......... 280/124.106, 280/124.116, 124.166; 29/897.2; 301/124.1
See application file for complete search history.

(56) References Cited

U.S. PATENT DOCUMENTS

| | | | | |
|---|---|---|---|---|
| 5,518,265 A | * | 5/1996 | Buthala et al. | 280/124.166 |
| 5,520,407 A | * | 5/1996 | Alatalo et al. | 280/124.166 |
| 5,909,888 A | * | 6/1999 | Betz et al. | 280/124.166 |
| 6,059,314 A | * | 5/2000 | Streubel et al. | 280/798 |
| 6,122,948 A | * | 9/2000 | Moses | 72/61 |
| 6,145,271 A | * | 11/2000 | Kossmeier et al. | 52/843 |
| 6,152,468 A | * | 11/2000 | Glaser et al. | 280/124.134 |
| 6,523,841 B2 | * | 2/2003 | Glaser et al. | 280/124.106 |
| 6,533,300 B1 | * | 3/2003 | Hicks et al. | 280/124.106 |
| 6,616,157 B2 | * | 9/2003 | Christophliemke et al. | 280/124.106 |
| 6,758,921 B1 | | 7/2004 | Streubel et al. | |
| 7,478,820 B2 | * | 1/2009 | Murata | 280/124.106 |
| 7,967,308 B2 | * | 6/2011 | Toepker | 280/124.106 |

FOREIGN PATENT DOCUMENTS

| | | |
|---|---|---|
| DE | 29719347 U1 | 1/1998 |
| DE | 19653959 C1 | 2/1998 |
| DE | 9422472 U1 | 7/2003 |
| EP | 0752332 A1 | 1/1997 |
| EP | 1078785 A2 | 2/2001 |
| EP | 1036679 B1 | 8/2004 |

* cited by examiner

*Primary Examiner* — Faye M. Fleming
(74) *Attorney, Agent, or Firm* — Harness, Dickey & Pierce, P.L.C.

(57) ABSTRACT

In a front wheel drive vehicle a traditional twist beam axle suffers from a short service life due to premature failures in intermediate areas between the end sections and the transitional section. A twist beam suspension is provided comprising a transverse strut (16) interconnecting longitudinal control arms (12). The transverse strut (16) may be formed from a tubular pipe. The tubular member may define a pair of tubular end sections (18), a deformed, U-shaped transitional section (20), and a pair of intermediate sections (22) between the end sections (18) and the transitional section (20). The intermediate section (22) may define a contour (28), known as a tongue. The tongue (28) enhances the flexibility in torsion and improves the stiffness in bending of the transverse strut (16). The tongue (28) may also include a concavity, to further aid in improving stiffness.

14 Claims, 2 Drawing Sheets

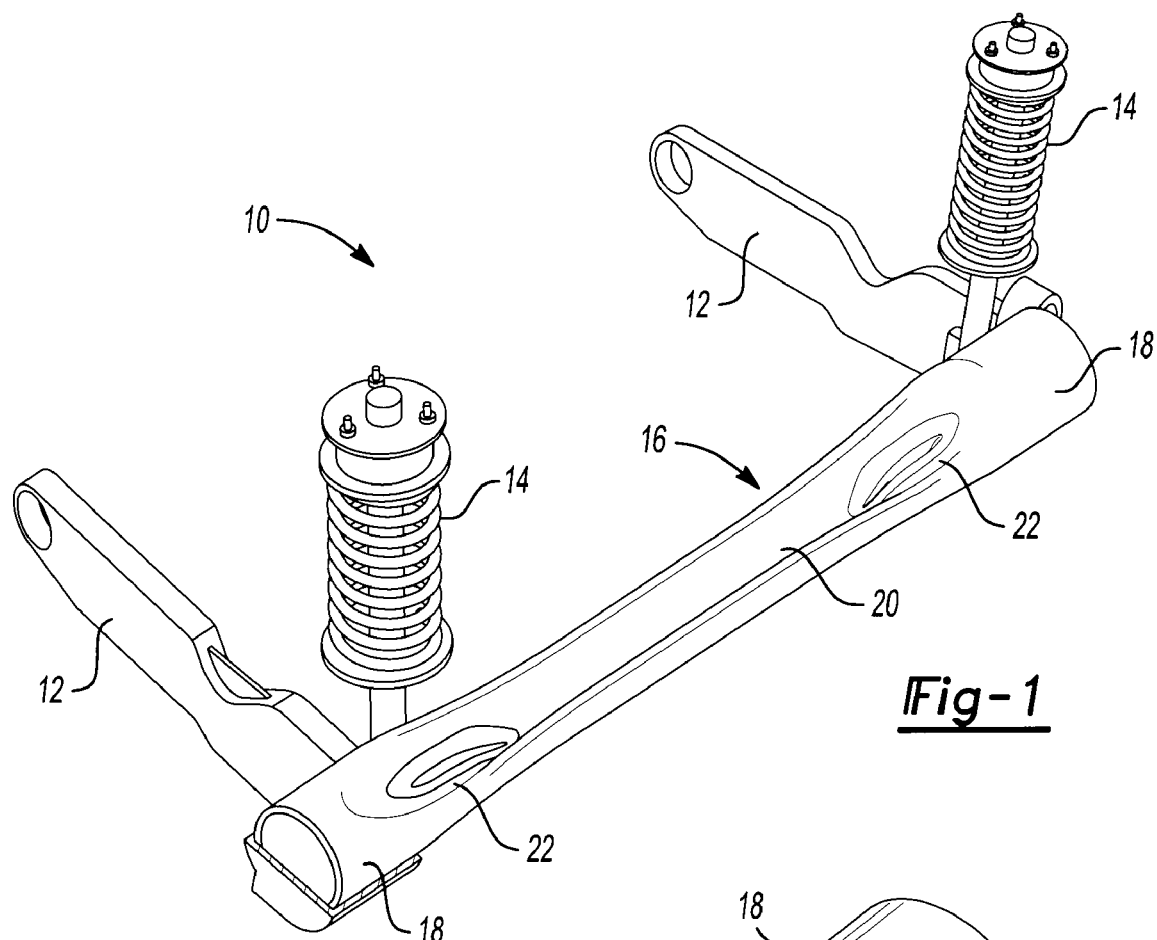
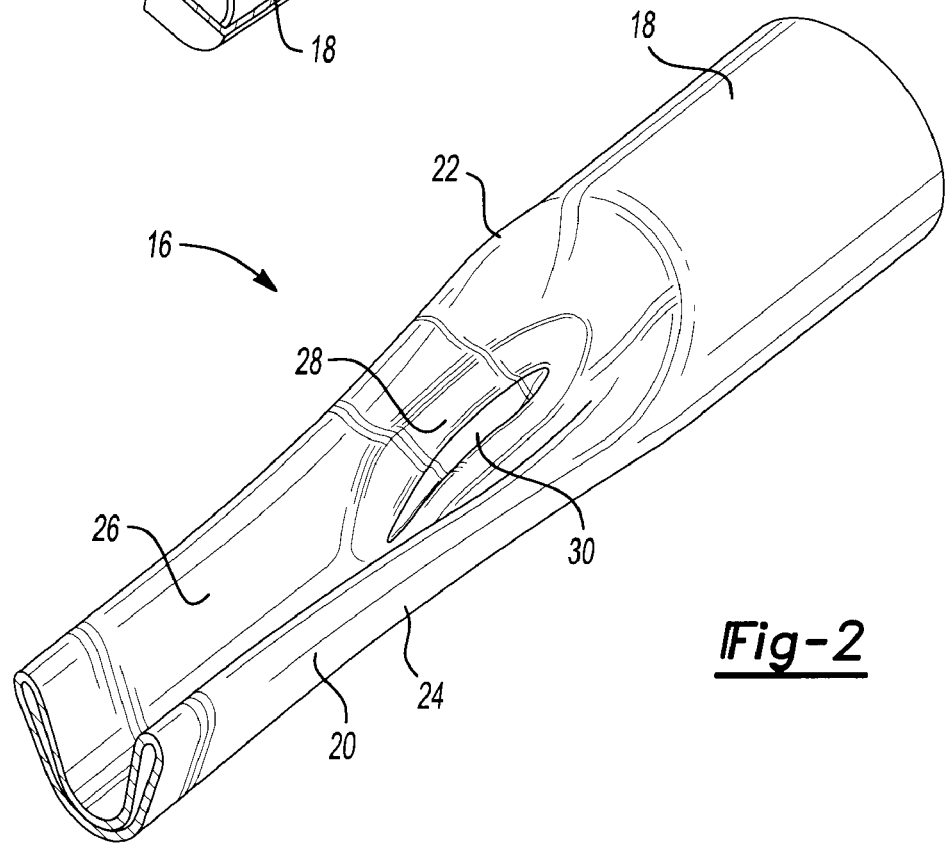

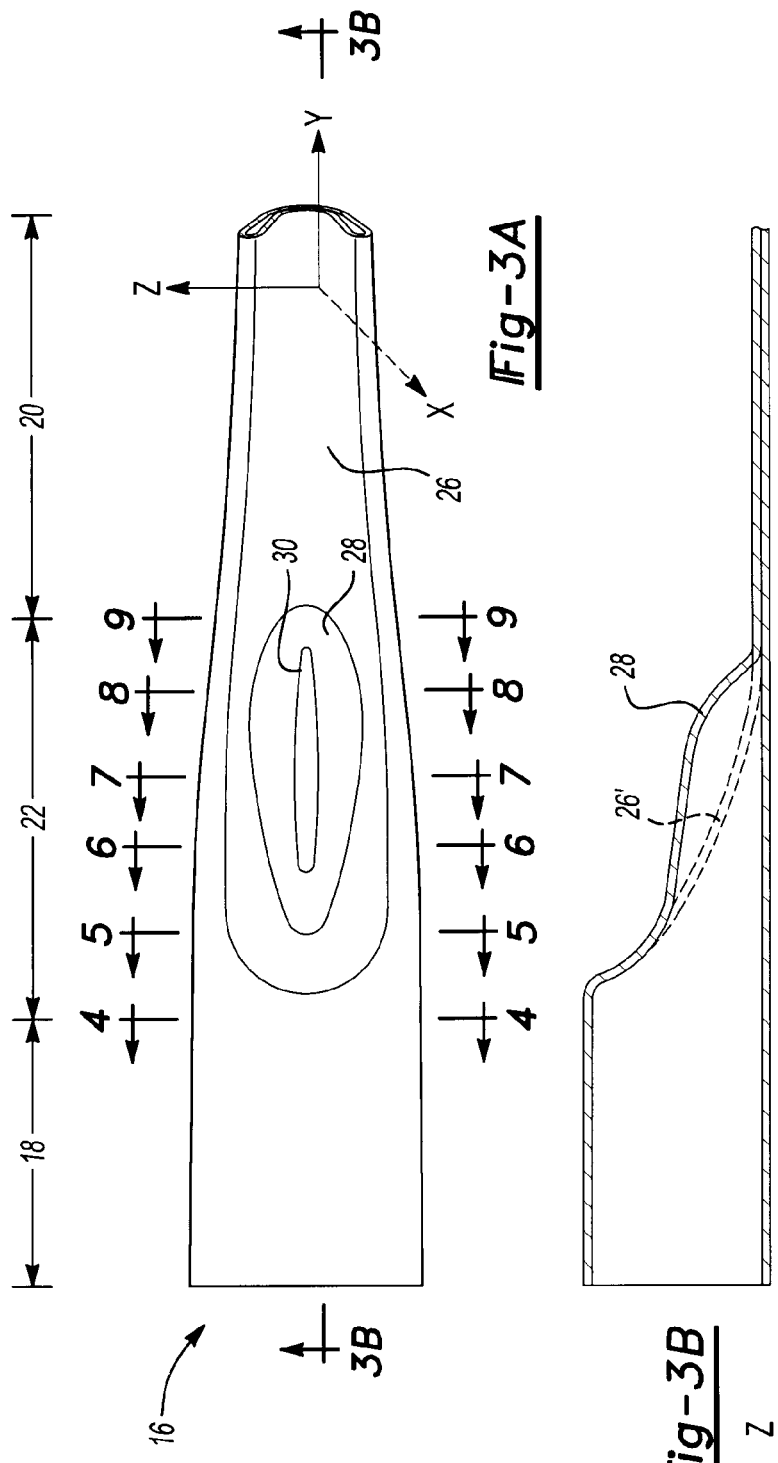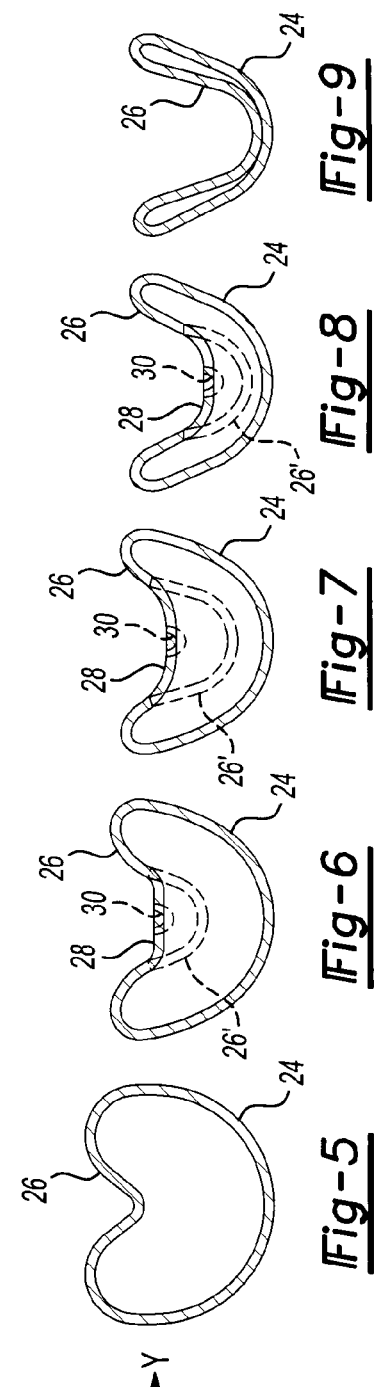

TWIST BEAM WITH INTERLOCK

FIELD OF THE INVENTION

The present invention relates to a torsion beam suspension of a vehicle and more particularly, to a rear axle twist beam having a transverse strut with an integrated contour.

BACKGROUND OF THE INVENTION

The statements in this section merely provide background information related to the present disclosure and may not constitute prior art.

Torsion beams are used in a vehicle structure to attach the two rear wheels together through use of longitudinal control arms. A particular type of torsion beam often used on rear suspensions of front-wheel drive vehicles is a twist beam. Twist beam suspensions generally make use of a transverse strut interconnecting the longitudinal control arms. The transverse strut is rigid enough to prevent bending and flexible enough to allow torsion. Essentially, the beam can twist to reduce the effect of one wheel's motion on the other wheel. This dichotomy is accomplished by use of a tubular blank deformed into a member with tubular end sections and a U- or V-shaped transitional section. The cross-section is defined by an inner and outer skin layer connected by a bended contour.

Although a twist beam axle is less expensive and more compact than a fully independent suspension, it was not used in practice because of its short service life. High loads experienced by the transverse strut generally caused premature failure in intermediate areas between the end sections and the transitional section. The use of embossments between the end sections and the transitional section have somewhat counteracted this problem, but not to a satisfactory level. Additionally, the embossments create added scrap from cracks initiated during the forming operation because of the sharp radii required for manufacture.

Accordingly, it is desirable in the art to provide a product that does not suffer the above limitations. This, in turn, will provide a simple and durable twist beam axle for motor vehicles with an increased service life.

SUMMARY OF THE INVENTION

A twist beam for a rear suspension of a front wheel drive vehicle may incorporate a tubular transverse strut. The tubular transverse strut may interconnect two longitudinal control arms. The tubular transverse strut may also define a pair of tubular end sections, a deformed torsion section, and a pair of intermediate sections between the end sections and the torsion section. The deformed torsion section of the transverse strut may be arranged in one of the following, I-, L-, T-, U-, V-, or X-shaped cross-sections. The deformed, tubular member may further define an inner and an outer skin. The inner skin of the intermediate sections may define a raised contour and a concavity to enhance the flexibility in torsion and improve the stiffness in bending of the transverse strut.

According to one aspect of the present disclosure, a transverse strut of a composite rear axle includes a pair of tubular end sections. A double-walled torsion section between the tubular end sections and including one of a U-shaped or V-shaped cross-section, thereby defining an inner and an outer skin. A pair of intermediate sections between said end sections and said torsion section, said intermediate sections including an outer skin and an inner skin, said outer skin of said intermediate sections providing a generally straight transition from said tubular end sections to said torsion section, said inner skin of said intermediate section transitioning from a tubular cross-section to said one of a U-shaped or V-shaped cross-section and including a raised contour in said inner skin. The raised contour defines a concavity.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein:

FIG. 1 depicts a perspective view of an exemplary rear vehicle axle having a transverse strut according to the principles of the present disclosure;

FIG. 2 depicts a perspective view of one end of the transverse strut according to the principles of the present disclosure;

FIGS. 3a and 3b depict a top view and a side sectional view of one end of the transverse strut according to the principles of the present disclosure;

FIG. 4 depicts a sectional view of the transverse strut of FIG. 3 taken along sectional line 4-4;

FIG. 5 depicts a sectional view of the transverse strut of FIG. 3 taken along sectional line 5-5;

FIG. 6 depicts a sectional view of the transverse strut of FIG. 3 taken along sectional line 6-6;

FIG. 7 depicts a sectional view of the transverse strut of FIG. 3 taken along sectional line 7-7;

FIG. 8 depicts a sectional view of the transverse strut of FIG. 3 taken along sectional line 8-8; and FIG. 9 depicts a sectional view of the transverse strut of FIG. 3 taken along sectional line 9-9.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring now to FIG. 1, a perspective view of an exemplary rear vehicle axle 10 is shown. The rear vehicle axle 10 includes a pair of longitudinal control arms 12; a pair of shock absorbers 14, commonly referred to as 'coil-over-oil' unit; and a transverse strut 16 for interconnecting the control arms 12. While FIG. 1 depicts a 'coil-over-oil' style shock absorber 14, the present teachings may also be applied to axles having separate springs and shocks, or torsion bars running across the chassis and attached to the leading edge of the control arms 12.

The transverse strut 16 of FIG. 1 may be fabricated from a tubular material deformed through a bending process. The bent design may allow the axle to twist slightly, whereby movement on one wheel may be partially absorbed by the twisting action of the transverse strut 16.

Further, the transverse strut 16 may define a pair of tubular end sections 18, as shown in FIG. 4; a deformed torsion section 20, as shown in FIG. 9; and a pair of intermediate sections 22 between the end sections 18 and the torsion section 20, as shown in FIGS. 5 through 8. The deformed torsion section 20 of the transverse strut 16 may have a U-shaped cross-section, as shown in FIG. 9, or it may be arranged in an I-, L-, T-, V-, or X-shaped cross section (not shown).

The deformation of the tubular member into the U-shaped torsion section 20, defines an outer skin 24 and an inner skin 26 of the U-shaped torsion section 20, shown in FIG. 9. While the outer skin 24 retains much of the original semi-cylindrical shape within the intermediate sections 22, the inner skin 26 defines a raised contour 28, hereinafter referred to as a tongue. The tongue 28, located in the intermediate section 22, enhances the flexibility in torsion and improves the stiffness in bending of the transverse strut 16.

Referring now to FIGS. 3a and 3b, a top view and a side sectional view of the transverse strut 16 are shown to better depict the tongue 28 detail. Between sections 4-4 and 5-5 from FIG. 3a, the inner skin 26 begins to follow a generally concave shape toward the longitudinal axis x and centered around the transverse axis z (transverse 4 to the longitudinal axis and along a line of symmetry of the strut 16), shown in FIG. 5. The concave shape is very steep, approximately 60-75 degrees from the longitudinal axis taken through the length of the transverse strut 16, moving quickly away from the end sections 18. The angle of descent changes when it is just above the torsion beam centerline (x-axis). Between sections 5-5 and 7-7, the concave shape continues, but the angle of declivity is much more shallow, approximately 8-15 degrees from the longitudinal axis. Cutaway sections shown in FIGS. 6 and 7 characterize the minimal change in tongue 28 depth. Although still in a sloping decline between sections 7-7 and 8-8, the inner skin 26 now takes on a convex shape, illustrated most clearly in FIG. 3b. The slope once again changes when it is just below the torsion beam centerline (x-axis). From section 8-8 to section 9-9, the inner skin 26 takes on a steep concave shape of approximately 65-85 degrees until it reaches the final U-shaped torsion section 20, shown in FIG. 9. Further, from section 5-5 to section 9-9, the tongue 28 may define an indentation 30 of a depth of approximately 3 mm to aid in stiffening the transverse strut 16.

FIG. 3b and FIGS. 6 through 8 compare, in phantom, an example of a cross-section without the tongue 28 design. The inner skin 26' of the intermediate section 22 is defined by a continuous concave slope toward the longitudinal axis x and centered around the transverse axis z, shown in FIG. 5, to the final U-shaped torsion section 20, shown in FIG. 9.

The forming operation of the transverse strut 16 involves a first pre-forming step utilizing a first upper crash die that deforms a cylindrical tube into a preform having an upper wall portion indented toward the lower wall portion in the intermediate section while mandrels are received in each end to prevent the tube ends from deforming. A final forming step is then performed using a second upper crash die. The first and second upper crash dies each include a clearance for the contour to form by the mandrel. In other words, the contour 28 is preformed in the first step and final formed in the second U-forming step.

The description of the present disclosure is merely exemplary in nature, and, thus, variations that do not depart from the gist of the present disclosure are intended to be within the scope of the present disclosure. Such variations are not to be regarded as a departure from the spirit and scope of the disclosure.

What is claimed is:

1. A tubular transverse strut for a composite rear axle, said transverse strut comprising:
    a pair of tubular end sections;
    a deformed torsion section; and
    a pair of intermediate sections between said end sections and said torsion section, wherein said intermediate sections each include an outer skin portion and an inner skin portion, said inner skin portion transitioning from said tubular end sections to said torsion section and wherein said inner skin portion of each intermediate section defines a raised contour following a generally concave shape followed by a steep angle of decline until it reaches said torsion section to present a tongue shaped contour.

2. The transverse strut of claim 1, wherein said intermediate sections of said transverse strut are defined by a length greater than a length of said tongue shaped contour.

3. The transverse strut of claim 1, wherein said tongue shape contour further defines a convex contour when viewed in a longitudinal cross section.

4. The transverse strut of claim 1, wherein said outer skin of said intermediate sections maintain a generally semi-cylindrical shape.

5. The transverse strut of claim 1, wherein said tongue shaped contour in said inner skin of said intermediate sections are disposed between said tubular end sections and said torsion section.

6. The transverse strut of claim 1, wherein the inner skin of said intermediate sections follows a generally concave shape toward a longitudinal axis having an angle of descent from said tubular end section between 60-75 degrees relative to the longitudinal axis.

7. The transverse strut of claim 6, wherein an angle of descent reduces before said inner skin extends to said longitudinal axis.

8. The transverse strut of claim 7, wherein said angle of descent reduces to approximately 8-15 degrees from the longitudinal axis.

9. The transverse strut of claim 8, wherein just below the longitudinal axis, said inner skin takes on a descent of approximately 65-85 degrees until it reaches said torsion section.

10. The transverse strut of claim 9, wherein said tongue shaped contour defines an indentation.

11. The transverse strut of claim 10, wherein said indentation has a depth of approximately 3 mm.

12. The transverse strut of claim 1, wherein said inner skin of said intermediate sections transition from said tubular end sections at a first angle of inclination and transition to said tongue shaped contour at a second angle of inclination smaller than said first angle of inclination and said tongue shaped contour transitions to a third angle of inclination greater than said second angle of inclination that transitions to said torsion section.

13. The transverse strut of claim 1, wherein said torsion section has one of a U-shaped or V-shaped cross-section.

14. A rear axle assembly for a vehicle comprising:
    a pair of longitudinal control arms;
    a pair of combination springs and shocks;
    a tubular transverse strut interconnecting said control arms;
    said tubular transverse strut having a pair of tubular end sections, a deformed torsion section, and a pair of intermediate sections transitioning between said end sections and said torsion section; and
    each of said intermediate sections having an outer skin portion and an inner skin portion, and wherein said inner skin portion of each intermediate section defines a raised contour following a generally concave shape followed by a steep angle of decline until it reaches said torsion section to present a tongue shaped contour.

* * * * *